(12) United States Patent
Struve' et al.

(10) Patent No.: US 12,686,466 B2
(45) Date of Patent: Jul. 21, 2026

(54) POWER-SPLIT HYBRID DRIVELINE FOR AN ELECTRIC BICYCLE

(71) Applicant: RAICAM DRIVELINE S.R.L., Mondovi' (IT)

(72) Inventors: Benjamin Chetwood Struve', Kenilworth (GB); Sandro Bonardo, Peveragno (IT); Gianpiero Lenta, Roreto di Cherasco (IT); Flavio Santomauro, Sommariva del Bosco (IT); Fausto Michele Pignatta, Busca (IT); Andrea Canestrari, San Costanzo (IT)

(73) Assignee: Raicam Driveline S.R.L., Mondovi (IT)

( * ) Notice: Subject to any disclaimer, the term of this patent is extended or adjusted under 35 U.S.C. 154(b) by 0 days.

(21) Appl. No.: 18/864,434

(22) PCT Filed: May 10, 2023

(86) PCT No.: PCT/IB2023/054828
§ 371 (c)(1),
(2) Date: Nov. 8, 2024

(87) PCT Pub. No.: WO2023/218370
PCT Pub. Date: Nov. 16, 2023

(65) Prior Publication Data
US 2025/0304211 A1     Oct. 2, 2025

(30) Foreign Application Priority Data
May 12, 2022     (IT) ........................ 102022000009794

(51) Int. Cl.
B62M 6/55          (2010.01)
F16H 3/72          (2006.01)

(52) U.S. Cl.
CPC ............... B62M 6/55 (2013.01); F16H 3/724 (2013.01)

(58) Field of Classification Search
CPC .................................. B62M 6/55; F16H 3/724
See application file for complete search history.

(56) References Cited

U.S. PATENT DOCUMENTS

2012/0165150 A1* 6/2012 Chan ....................... F16H 55/30
                                                        475/8
2017/0137086 A1* 5/2017 Yamamoto ................ F16H 3/66
                                (Continued)

FOREIGN PATENT DOCUMENTS

EP          3862256 A1      8/2021
WO      2020260772 A1      12/2020

OTHER PUBLICATIONS

International Search Report for International Patent Application No. PCT/IB2023/054828, mailed Aug. 11, 2023.

*Primary Examiner* — Farhana Pervin
(74) *Attorney, Agent, or Firm* — Armstrong Teasdale LLP

(57)          ABSTRACT

An electric auxiliary drive system for a bicycle having a pedal crankshaft, an epicyclic gearing mechanism, an assist motor for driving an output shaft, and a control motor for controlling, through the epicyclic gearing mechanism, a transmission ratio between the pedal crankshaft and the output shaft is provided. A first one-way clutch operatively connected to the control motor is configured for blocking a rotation of a rotatable member of the epicyclic gearing mechanism in a forward direction of rotation while allowing the rotation of the rotatable member of the epicyclic gearing mechanism in a reverse direction of rotation. A second one-way clutch is configured for drivingly connecting the assist motor to the output shaft when the assist motor is switched on, and for disengaging the assist motor from the (Continued)

output shaft when the assist motor is switched off but the output shaft continues rotation in the forward direction.

6 Claims, 5 Drawing Sheets

(56)                References Cited

U.S. PATENT DOCUMENTS

| | | | |
|---|---|---|---|
| 2017/0217538 A1 | 8/2017 | Yamamoto | |
| 2017/0219066 A1* | 8/2017 | Yamamoto | B62M 6/55 |
| 2020/0398937 A1* | 12/2020 | Son | B62M 11/145 |

* cited by examiner

POWER-SPLIT HYBRID DRIVELINE FOR AN ELECTRIC BICYCLE

CROSS-REFERENCE TO RELATED APPLICATIONS

This application is a National Stage Application of International Patent Application No. PCT/IB2023/054828, having an International Filing Date of May 10, 2023, claiming priority to Italian Patent Application No. 102022000009794, having a filing date of May 12, 2022, each of which is hereby incorporated by reference in its entirety.

TECHNICAL FIELD

The present invention pertains to the field of electrically powered bicycles (or "e-bikes") with an electric motor assisting the rider's pedal-power. More specifically, the present invention concerns a hybrid driveline for an e-bike.

BACKGROUND TO THE INVENTION

Power-split hybrid drivelines have been recently proposed for electric bicycles. Some of these systems include a pedal crankshaft for operation by a rider, an epicyclic gearing mechanism, an assist motor and a control motor. The epicyclic gearing mechanism is arranged to determine the transmission ratio between the pedal crankshaft and an output shaft for transmitting rotation to a rear wheel of the bicycle. The epicyclic gearing mechanism is referred to as an epicyclic "power-split" gearing mechanism, because it is arranged to transfer power from the pedals to the rear wheel of the bicycle through two routes: a mechanical route and an electrical route. Specifically, the epicyclic gearing mechanism transmits power from the assist motor to the output shaft. Furthermore, the epicyclic gearing mechanism adjusts the rotational speed of the pedal crankshaft as a result of the operation of control motor.

WO 2020/260772 A1 discloses a power unit for pedal vehicle. The power unit comprises a pedal shaft, an output shaft arranged to transfer torque to a vehicle wheel, a main epicyclic gear set arranged to control transmission ratio between the pedal shaft and the output shaft, an assist motor connected to an assist gear of the main epicyclic gear set, and a control motor connected to a control gear of the main epicyclic gear set. The control motor and the control gear form a control assembly of the power unit. The power unit comprises a one-way clutch associated with the control assembly of the power unit and arranged to transmit rotation in only a first rotation direction.

A first problem encountered in some epicyclic "power-split" drivelines it that the torque from the pedals is always reacted by the ratio controlling motor. When the bicycle is ridden at low road speeds in a low gear ratio, the speed of the ratio controlling motor is low and hence the motor is very inefficient. The majority of the electrical energy supplied to the motor is lost as heat. This leads to shortening of the motor's life and also inefficient use of the electrical energy stored in the battery.

Another problem with some epicyclic "power-split" drivelines is that at high road speeds and high gear ratios, the ratio controlling motor turns quickly to maintain the desired pedal speed, whilst still reacting against the torque from the pedals. Consequently, the ratio controlling motor may deliver a high level of mechanical power to the system, hence no supplementary assistance is required from the traction motor which may be switched off but is still required to rotate in unison with the rear wheel. Hence the traction motor will generate electrical energy under this circumstance which may cause damage to the electronic systems.

SUMMARY OF THE INVENTION

According to an aspect, the present invention provides an electric auxiliary drive system for a bicycle, comprising a pedal crankshaft for operation by a rider, an epicyclic gearing mechanism, an assist motor, a control motor, first and second one-way clutches. The epicyclic gearing mechanism is arranged to determine a transmission ratio between the pedal crankshaft and an output shaft for transmitting rotation to a rear wheel of the bicycle. The assist motor is drivingly connected to the output shaft. The control motor is drivingly connected to the epicyclic gearing mechanism for controlling the transmission ratio between the pedal crankshaft and the output shaft. The first one-way clutch is operatively connected between the ratio controlling motor and a rigid element fixedly mountable to the bicycle frame, and is configured for blocking the rotation of a first rotatable member of the epicyclic gearing mechanism in a first, forward direction of rotation and for releasing and allowing free rotation of said first rotatable member of the epicyclic gearing mechanism in a second, reverse direction of rotation. The second one-way clutch is configured for drivingly connecting the assist motor to the output shaft when the assist motor is switched on to drive the output shaft in a forward direction, so as to assist in driving the bicycle forwards, and for disengaging the assist motor from the output shaft when the assist motor is switched off but the output shaft continues rotation in the forward direction.

Preferably, the epicyclic gearing mechanism comprises a sun gear secured for rotation with the output shaft, a ring gear, a set of planet gears between the sun gear and the ring gear, and a planet carrier which is secured for rotation with the pedal crankshaft and supports the planet gears. According to an embodiment, the ring gear meshes with a first pinion gear mounted on a first shaft driven by the control motor, and the first one-way clutch is operatively connected between the first shaft of the control motor and said rigid element fixedly mountable to the bicycle frame.

BRIEF DESCRIPTION OF THE DRAWINGS

In order that the present invention may be well understood there will now be described a few preferred embodiments thereof, given by way of example, reference being made to the accompanying drawings, in which.

DETAILED DESCRIPTION OF THE INVENTION

Figure 1:
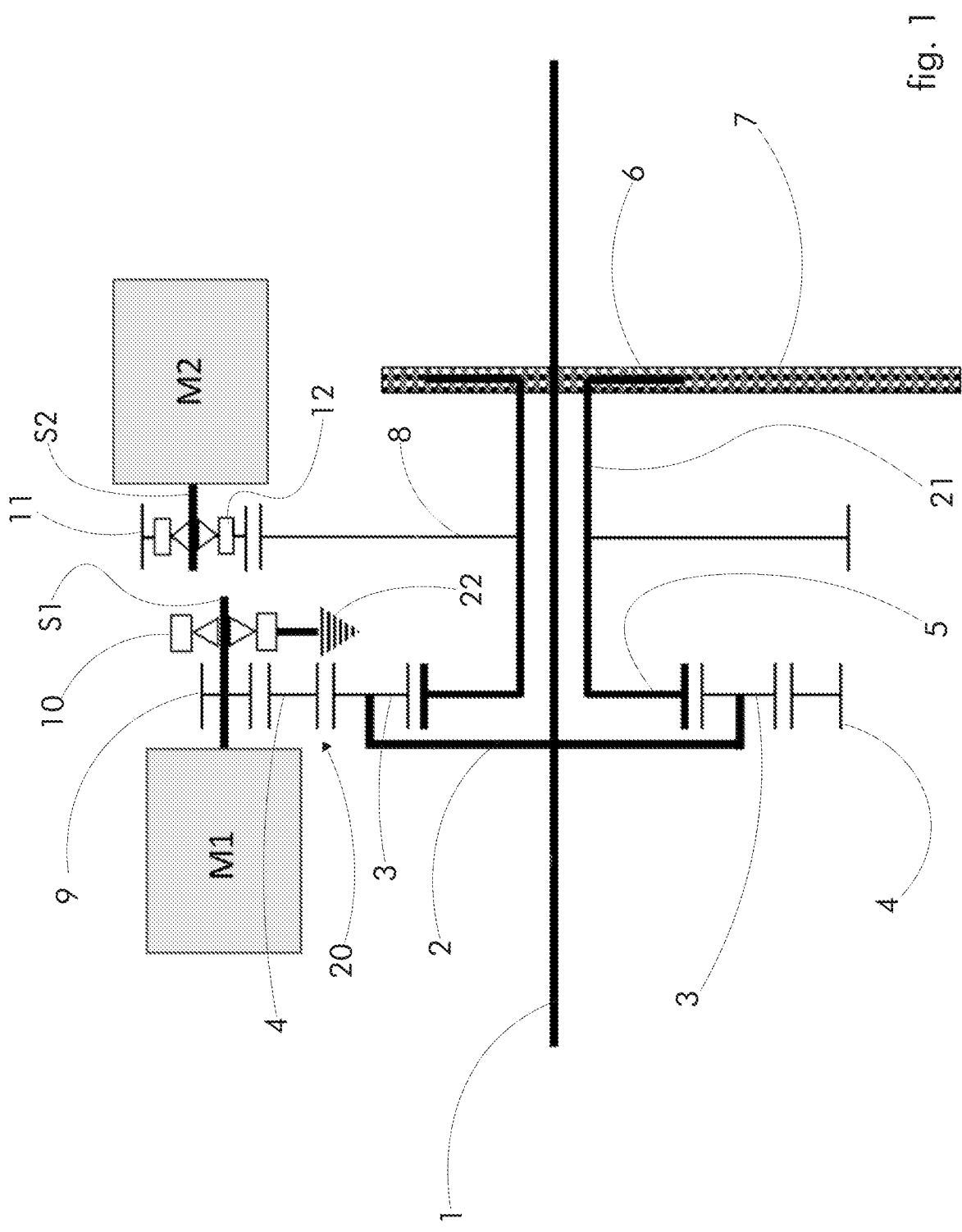
FIG. 1 is a schematic cross-sectional view of the main components of an e-bike drive system according to an embodiment of the present invention.

Referring initially to FIG. 1, an e-bike drive system comprises two electric motors, M1, M2, and an epicyclic gearing mechanism 20 having an output shaft 21. Secured for rotation with the output shaft 21 is a chain ring 6 that drives the rear wheel (not shown) of the bicycle. Designated at 1 is a pedal shaft or crankshaft for operation by a rider R.

The pedal shaft 1 passes through the assembly and connects together two conventional pedal crank and foot support assemblies (not illustrated in the drawings) which are mounted outside the drive unit. The pedal shaft 1 takes the torque and speed supplied by the rider and transfers it to the planetary carrier 2.

Electric motor M1 is termed "control" motor, or "ratio controlling" motor, because it drives a gear of the epicyclic gearing mechanism that controls the transmission ratio between the output shaft and the pedal crankshaft. Electric motor M2, termed "assist" motor (or "traction" motor) herein, generates power that is transmitted to the output shaft 21.

In this context, the epicyclic gearing mechanism is also referred to as an epicyclic "power-split" gearing mechanism, because it is arranged to transfer power from the pedals to the rear wheel of the bicycle through two routes, as explained herein after: a mechanical route MR and an electrical route ER. Specifically, the assist motor M2 transmits power to the output shaft. Furthermore, the epicyclic gearing mechanism adjusts the rotational speed of the pedal crankshaft 1 as a result of the operation of control motor M1.

The c-bike drive system is to be accommodated in a housing (not shown in the drawings), preferably mounted in use centrally within the frame of a bicycle (at the 'bottom bracket'). Typically, the housing provides mountings and reaction points with rolling bearings rotatably supporting the pedal crankshaft 1. The housing may also contain an electronic controller (not shown in the drawings) for the drive system.

The epicyclic gearing mechanism 20 comprises a planetary carrier 2 which supports a number of planet gears 3 and applies the rider's torque and speed to the epicyclic gearing mechanism. The planetary carrier 2 is secured for rotation with the pedal shaft 1. The pedal shaft 1 takes the torque and speed supplied by the rider and transfers it to the planetary carrier 2.

The power split epicyclic gearing mechanism comprises a sun gear 5 which is driven for rotation by the assist motor M2 and is secured for rotation with the chain-ring 6 located on the right side of the system. The sun gear 5 is secured for rotation with the chain ring 6 and has external teeth which mesh with the planet gears 3.

A ring gear 4 has internal teeth which mesh with the planet gears 3, and a number of external teeth which mesh with a first pinion gear 9 driven directly by the ratio controlling motor M1.

The planet gears 3 are free to rotate relative to the planetary carrier 2 and hence apply an equal tangential force to the gear-teeth of the ring gear 4 and the sun gear 5, regardless of the relative speeds of these components. Hence, a fixed proportion of the torque from the rider is distributed to the ring gear and the remaining proportion of the torque from the rider is distributed to the sun gear.

The output shaft 21 may be a hollow tubular shaft through which the pedal shaft 1 passes.

The chain sprocket or belt sprocket 6 drives either a chain or a toothed belt 7 which drives the rear wheel of the bicycle.

A traction gear 8 is secured for rotation with the sun gear 5 and the sprocket or chain ring 6. The traction gear 8 has outer teeth which mesh with a second pinion gear 11 driven directly by the assist motor M2.

A first one-way clutch 10 which releasably connects a first shaft S1 of the ratio controlling motor M1 to a rigid element 22 fixedly secured to or integral with the bicycle frame. Preferably, the rigid, fixed element 22 may be a housing of the drive unit.

The first one-way clutch 10 is arranged to block the rotation of ring gear 4 in the forward direction (i.e. the forward direction being the direction of rotation of the pedals, the chain and the wheels of the bicycle when it is moving forwards), but to allow free rotation of the ring gear 4 in the reverse direction. According to an embodiment, the first one-way clutch 10 may comprise a one-way roller bearing which is pressed into a bore within the housing 22.

As shown in the exemplary embodiment illustrated in FIG. 1, the first shaft S1 of the control motor M1 is parallel to the axis of rotation of the ring gear 4.

According to an alternative embodiment (not shown), the first shaft S1 of the control motor M1 may be oriented perpendicular to the axis of rotation of the ring gear 4, whereby the ring gear 4 forms internal teeth which mesh with the planet gears 3, and side teeth which mesh with the first pinion gear 9 according to a bevel gear arrangement.

The second pinion gear 11 is connected to a shaft S2 of the assist motor M2 via a second one-way clutch 12. The second pinion gear 11 meshes with the traction gear 8 so that assist motor M2 can assist in driving the bicycle forwards.

The second one-way clutch 12 that connects assist motor M2 with its pinion gear 11 is arranged so that it is engaged when the assist motor M2 is attempting to drive the traction gear 8 in the forward direction, so as to assist in driving the bicycle forwards. The second one-way clutch 12 allows free rotation of the traction gear 8 when the assist motor M2 is switched off but the traction gear continues to rotate in the forward direction.

The first and the second one-way clutches 10, 12 may be, for example, in the form of a pawl and ratchet, or a sprag clutch with rollers which ride up ramps within a cage, or a belt or strap which is wrapped around a shaft.

Due to the above arrangement, control motor M1, by controlling the speed of the ring gear 4, controls the ratio between the speed of the pedals and the speed of the bicycle. Assist motor M2, by driving the traction gear 8, applies torque to the chain gear 6 and assists in moving the bicycle forwards.

The above described e-bike drive system functions in the following way. When the bicycle is starting from rest, the rider applies torque to the system via the pedals. This torque is transferred into the system via the pedal shaft 1, planetary carrier 2 and to the planet gears 3. The planet gears then distribute this applied torque between the ring gear 4 and the sun gear 5.

Figure 2:
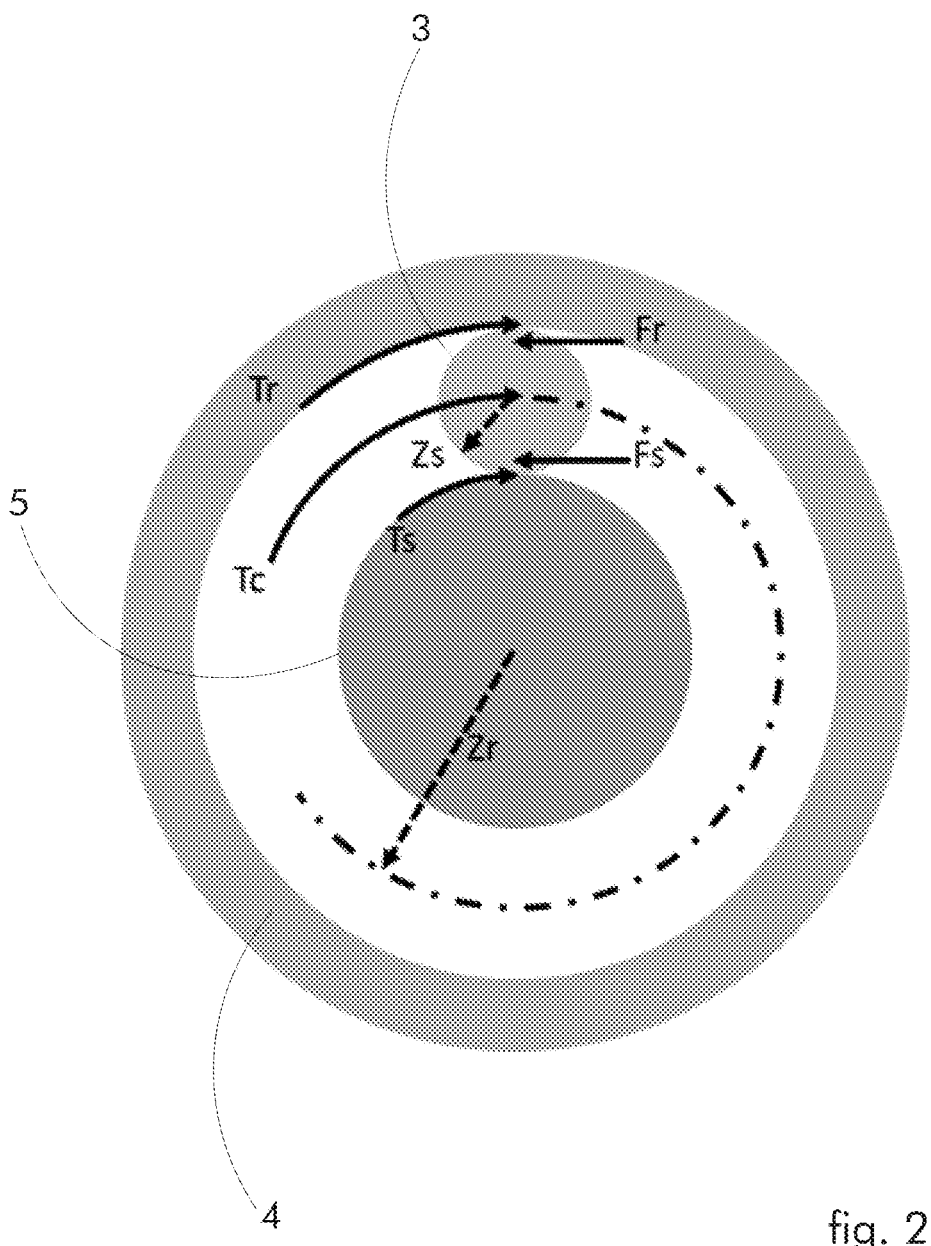
FIG. 2 diagrammatically shows the torque split relationship through the epicyclic gear mechanism.

The distribution of torque between the ring gear and the sun gear is schematically shown in FIG. 2, wherein:

Tc=torque applied to the planetary carrier 2;

Zr=radius of the planetary carrier 2;

Zs=radius of the planetary gears;

Fr=tangential force applied to the ring gear 4;

Fs=tangential force applied to the sun gear 5;

and wherein $Fr=Fs=\frac{1}{2}*Tc/Zr$

Tr=torque applied to the ring gear: $Tr=Fr*(Zr+Zs)$; and

Ts=torque applied to the sun gear: $Ts=Fs*(Zr-Zs)$

Figure 3:
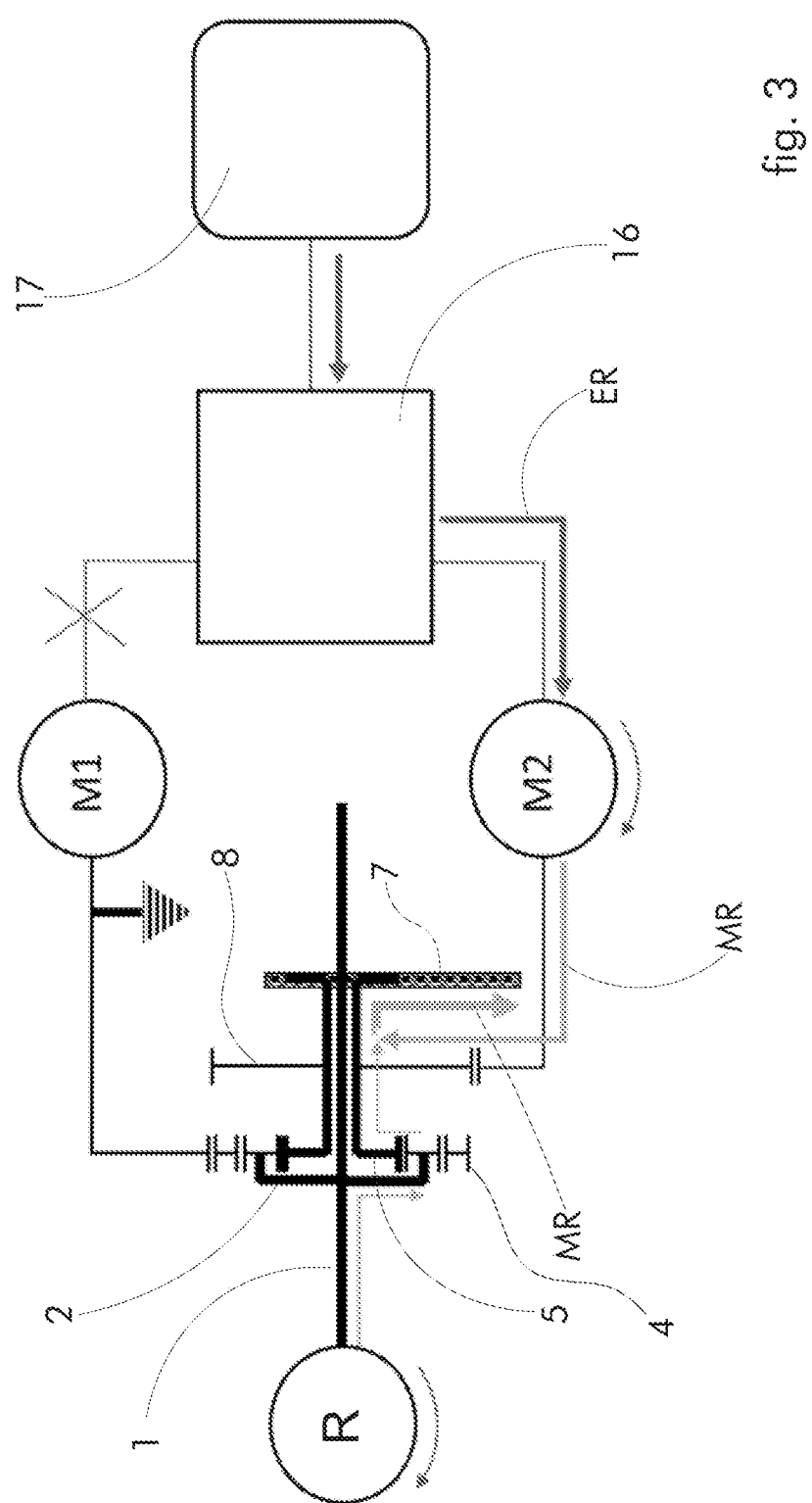
FIGS. 3, 4 and 5 schematically depict the power flow within the system during three stages of bicycle acceleration.

Initially, starting from rest (FIG. 3), the control motor M1 is switched off. The torque Tr is applied to the ring gear 4 in a forward direction, however the first one-way clutch 10 is arranged to block the forwards rotation of the ring gear 4. Hence the torque Tr is reacted by the first one-way clutch 10 and the ring gear 4 remains stationary. All of the power supplied by the rider R is hence diverted to the sun gear 5 and via the sprocket or chain gear 6 and the chain or belt 7, to the bicycle wheel. The gear ratio between the pedals and the wheel of the bicycle is expressed as follows:

$$\text{overall gear ratio} = \frac{\text{Rotation speed of bicycle wheel}}{\text{Rotation speed of the pedals}}$$

Due to the action of the first one-way clutch 10, which allows rotation of the ring gear 4 in the reverse direction but does not allow rotation in the forwards direction, the lowest overall gear ratio exists when the ring gear 4 is stationary. The ratios of the epicyclic gearing mechanism and the chain or belt ratio may be arranged so that the ratio with the ring gear stationary equates to a suitable ratio for starting the bicycle from rest or climbing a steep hill. By way of indication, this lowest ratio may have a numerical value of approximately 1 for a touring or commuter bicycle.

During the starting from rest the traction motor M2 may be energised by the battery 17 through the controller 16 in order to provide assistance to the rider in moving the bicycle forwards. The traction motor M2 applies torque via the second one-way clutch 12 and the pinion gear 11 to move the traction gear 8 in a forward direction and hence assist with the forward acceleration of the bicycle. The second one-way clutch 12 is arranged so that it is locked when the traction motor M2 is applying torque to the traction gear 8 in the forward direction.

Figure 4:
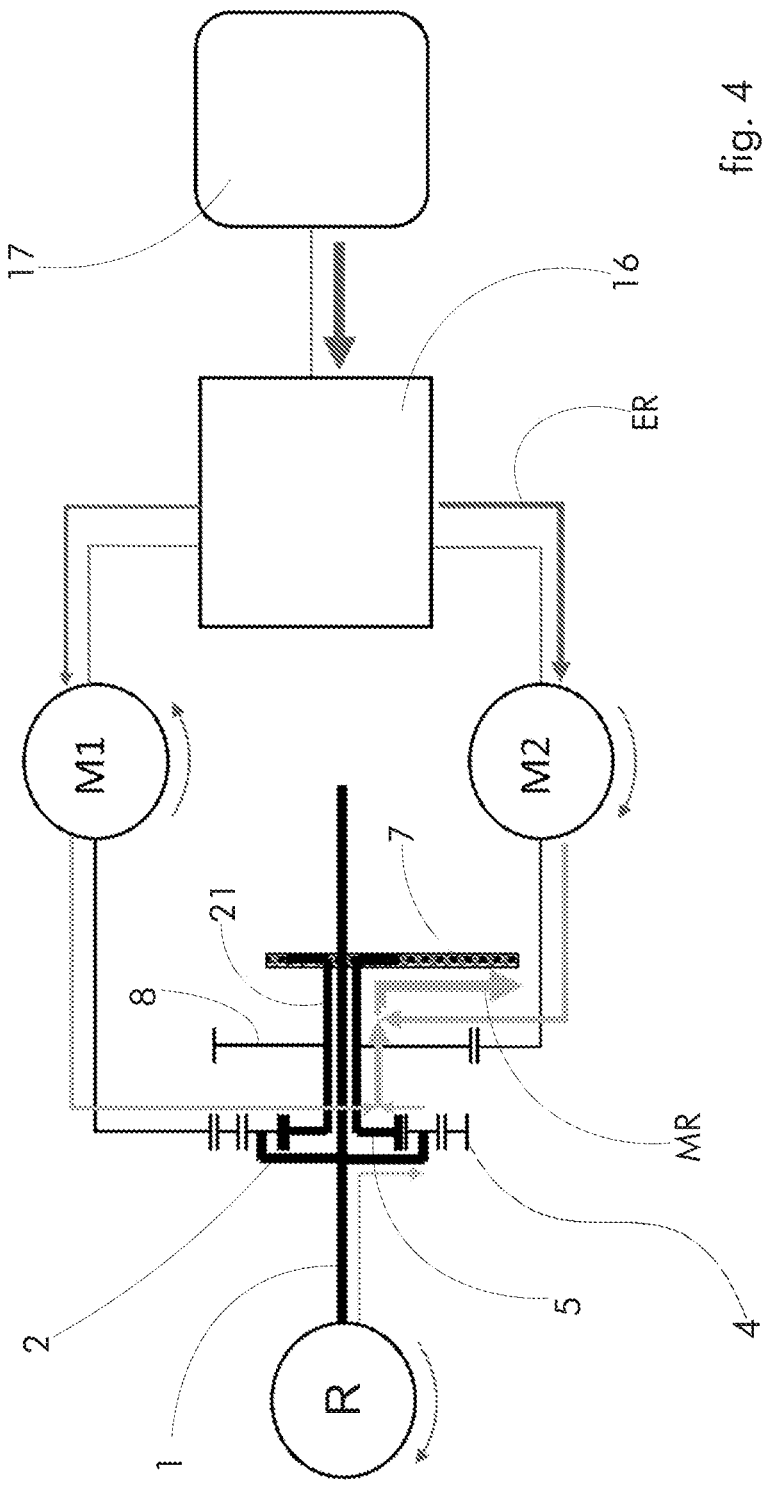

As the bicycle starts to increase its speed, there is the requirement for the overall gear ratio value to increase in order that the rotational speed of the pedals (i.e. the rotational speed of the pedal shaft 1) be maintained at a speed which is comfortable for the rider. This is achieved by energising the control motor M1 (FIG. 4) in order to rotate the ring gear 4 in the reverse direction. This action unlocks the first one-way clutch 10, which is arranged to allow free rotation of the ring gear 4 in reverse. The speed of control motor M1 is controlled in order to maintain the desired ring gear speed (Wr) which is given by the following equation:

$$Wr = (Wc(Zr + Zs) - Ws \times Zs)/Zr$$

where:
Wc=desired rotational speed of pedal shaft 1;
Ws=rotational speed of sun gear 5;
Wr=consequently required speed of ring gear 4;
Zr and Zs are the system radii which define the lever ratios within the epicyclic gearing mechanism, as described graphically in FIG. 2.

As the speed of control motor M1 starts to increase in order to maintain a comfortable pedalling speed, it starts to supply mechanical power to the system:

$$Power_{M1} = Wr * Tr$$

Where Tr is the torque applied to the ring gear 4 in order to react against the pedalling torque of the rider (as illustrated in FIG. 2).

Complying with the law of conservation of energy the mechanical power supplied by control motor M1 supplements the mechanical power supplied by traction motor M2 in assisting the rider to move the bicycle forwards.

Figure 5:
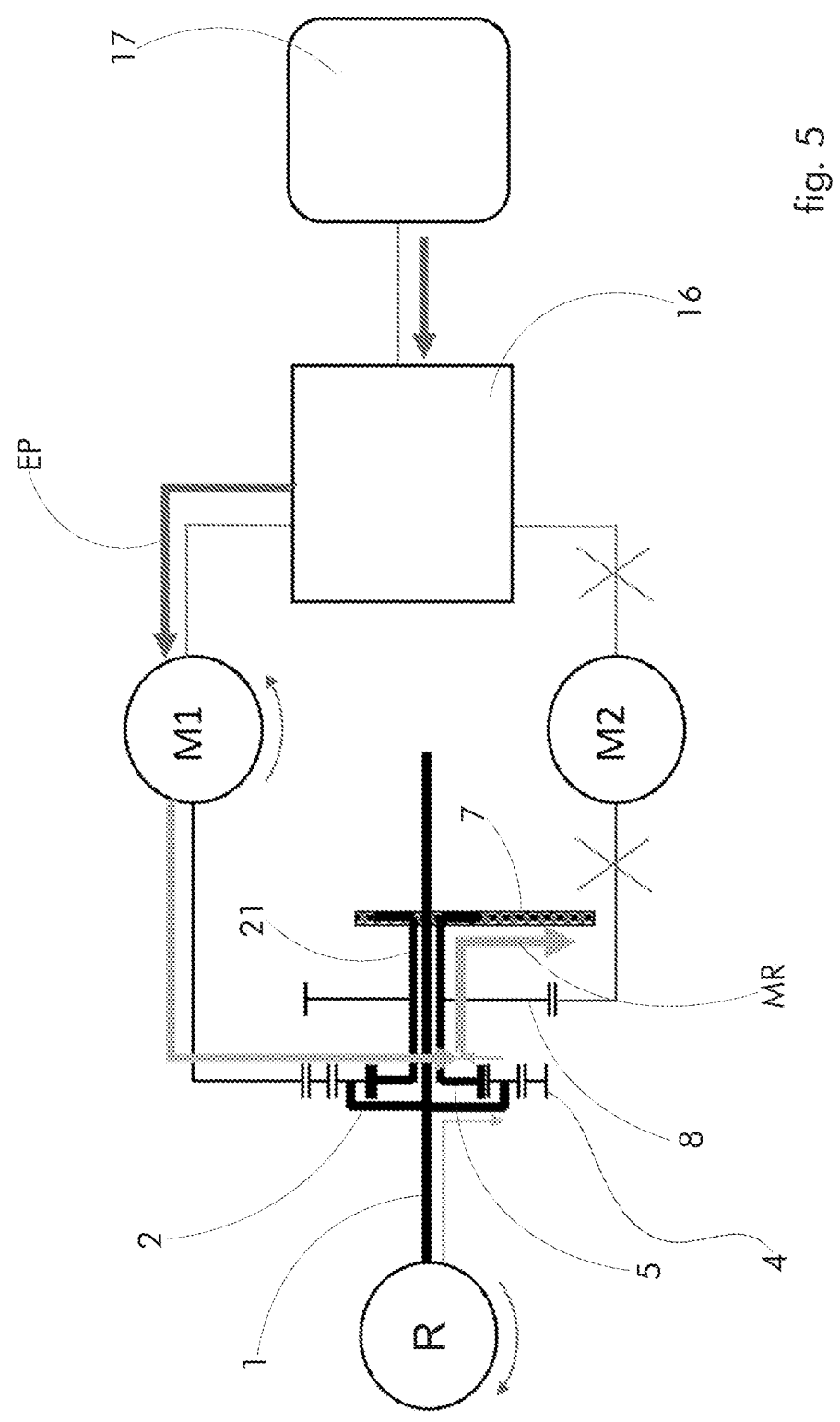

As the speed of the bicycle increases further, the torque Tr applied by the rider tends to remain substantially constant, whereas the speed of the control motor M1 continues to increase in order to maintain a comfortable pedalling speed, hence power of control motor M1 increases. At some point, which can be set by programming the controller 16, the power PowerM1 of control motor M1 becomes sufficient to deliver the desired electrical assistance power to the bicycle, and no further assistance is required from the traction motor M2. Traction motor M2 may then be switched off (FIG. 5) in order to save electrical energy. The bicycle continues to move forwards, assisted by power from the rider and the ratio controlling motor M1, and consequently the traction gear 8 continues to rotate in a forward direction. However, a forward torque is no longer applied to the traction gear by traction motor M2, and consequently the second one-way clutch 12 unlocks, allowing the pinion gear 11 to rotate freely relative to the shaft of traction motor M2. Therefore, traction motor M2 is allowed to come to rest and it transmits no decelerating torque to the traction gear 8 or consequently to the wheel of the bicycle.

It may be observed that if the first one-way clutch 10 was not present, when starting from rest at lower speed ratio (FIG. 3) the torque Tr would need to be reacted solely though control motor M1. Since current must be passed through the windings of the motor in order to generate the necessary opposing torque, the control motor M1 would consume electrical energy. However, as the control motor M1 was stationary, this motor would not generate any mechanical energy. Hence all of the electrical energy would be converted into heat within the motor windings which would be both inefficient and also detrimental to the durability of the motor.

It may also be observed that if the second one-way clutch 12 was not present, when accelerating at high speed (FIG. 5) the control motor M2 would continue to rotate and it would apply a decelerating torque to the traction gear 8 and consequently to the wheel of the bicycle. Also, a voltage would be generated within the windings of the motor which could potentially damage the electronic control system for the motor.

The following advantages and benefits of the present drive system may be appreciated.

Efficiency and durability of the drive system are improved due to reduced heating of the ratio controlling motor M1.

Due to the locking performance of the first one-way clutch 10, the bicycle may be ridden (in the lowest gear ratio) when there is no power supplied to either of the motors, for example when the battery is flat. This is an inherent characteristic of the system behaviour—it is not necessary to select any special locking device or operating mode of the system.

The system efficiency is improved at higher road speed because the traction motor M2 can be mechanically disconnected from the system when not required.

Because no braking torque can be generated by traction motor M2, it cannot generate any voltage within its windings which could damage the electronic system.

There is no necessity for either of the motors to regenerate any electrical energy. This leads to simplified motor control and electronic systems, and also a simplified battery management system which does not need to boost the motor voltage in order to recharge the battery.

What is claimed is:

1. An electric auxiliary drive system for a bicycle, comprising:
a pedal crankshaft for operation by a rider;
an epicyclic gearing mechanism configured to determine a transmission ratio between the pedal crankshaft and an output shaft for transmitting rotation to a rear wheel of the bicycle,

an assist motor for driving the output shaft;

a control motor drivingly connected to the epicyclic gearing mechanism for controlling, through the epicyclic gearing mechanism, the transmission ratio between the pedal crankshaft and the output shaft;

a first one-way clutch operatively connected between the control motor and a rigid element fixedly mountable to a bicycle frame, wherein the first one-way clutch is configured for blocking a rotation of a first rotatable member of the epicyclic gearing mechanism in a first, forward direction of rotation and for releasing and allowing free rotation of said first rotatable member of the epicyclic gearing mechanism in a second, reverse direction of rotation; and a second one-way clutch operatively connected between the assist motor and the output shaft, wherein the second one-way clutch is configured for drivingly connecting the assist motor to the output shaft when the assist motor is switched on to drive the output shaft in a forward direction, so as to assist in driving the bicycle forwards, and for disengaging the assist motor from the output shaft when the assist motor is switched off but the output shaft continues rotation in the forward direction, wherein the electric auxiliary drive system further comprises:

a second pinion gear releasably and drivingly connectable to a shaft of the assist motor through said second one-way clutch, and a traction gear which is secured for rotation with the output shaft and which meshes with said second pinion gear.

2. The electric auxiliary drive system of claim 1, wherein the epicyclic gearing mechanism comprises a sun gear secured for rotation with the output shaft, a ring gear, a set of planet gears between the sun gear and the ring gear, and a planetary carrier secured for rotation with the pedal crankshaft and supporting the set of planet gears;

and wherein the ring gear meshes with a first pinion gear mounted on a first shaft driven by the control motor, and the first one-way clutch is operatively connected between the first shaft of the control motor and said rigid element fixedly mountable to the bicycle frame.

3. The electric auxiliary drive system of claim 2, wherein the ring gear forms internal teeth which mesh with the planet gears of the set of planet gears, and external teeth which mesh with said first pinion gear.

4. The electric auxiliary drive system of claim 2, wherein the ring gear forms internal teeth which mesh with the planet gears of the set of planet gears, and side teeth which mesh with said first pinion gear according to a bevel gear arrangement.

5. The electric auxiliary drive system of claim 1, wherein the output shaft comprises an axially extending central tubular portion which coaxially surrounds a length of the pedal crankshaft.

6. An electrically powered bicycle comprising the electric auxiliary drive system of claim 1.

* * * * *